(12) United States Patent
Chambers

(10) Patent No.: US 11,087,634 B2
(45) Date of Patent: Aug. 10, 2021

(54) SYSTEM, METHOD, AND APPLICATIONS FOR MONITORING ONLINE USAGE OF MINORS

(71) Applicant: Christopher Chambers, Phoenix, AZ (US)

(72) Inventor: Christopher Chambers, Phoenix, AZ (US)

( * ) Notice: Subject to any disclaimer, the term of this patent is extended or adjusted under 35 U.S.C. 154(b) by 0 days.

(21) Appl. No.: 16/036,680

(22) Filed: Jul. 16, 2018

(65) Prior Publication Data

US 2019/0019426 A1    Jan. 17, 2019

Related U.S. Application Data

(60) Provisional application No. 62/604,659, filed on Jul. 17, 2017.

(51) Int. Cl.
| | |
|---|---|
| *G09B 5/02* | (2006.01) |
| *H04L 29/08* | (2006.01) |
| *H04H 60/33* | (2008.01) |
| *G09B 7/02* | (2006.01) |
| *G09B 5/00* | (2006.01) |
| *G06F 13/24* | (2006.01) |

(Continued)

(52) U.S. Cl.
CPC ............ *G09B 5/02* (2013.01); *H04L 67/22* (2013.01); *G06F 13/24* (2013.01); *G09B 5/00* (2013.01); *G09B 7/00* (2013.01); *G09B 7/02* (2013.01); *G09B 7/04* (2013.01); *H04H 60/33* (2013.01); *Y10S 706/927* (2013.01)

(58) Field of Classification Search
CPC ... G09B 7/02; G09B 7/04; G09B 7/00; G09B 5/065; G09B 5/00; G09B 5/02; Y10S 706/927; G06F 13/24; H04H 60/33; H04L 67/22

See application file for complete search history.

(56) References Cited

U.S. PATENT DOCUMENTS

| | | | | |
|---|---|---|---|---|
| 5,035,625 A | * | 7/1991 | Munson | G09B 7/00 434/332 |
| 5,059,127 A | * | 10/1991 | Lewis | G09B 19/00 434/353 |

(Continued)

*Primary Examiner* — Jack Yip
(74) *Attorney, Agent, or Firm* — Fish & Richardson P.C.

(57) ABSTRACT

Systems, software, and computer implemented methods associated with a smart monitoring system used to monitor, manage, and modify the usage of various applications and/or websites on a mobile or other computing device are described herein. In one example method, user interactions performed at a client device are monitored, and a determination is made as to whether the monitored user interactions are associated with non-educational content or applications. In response to determining that they are, an activity timer is increased based on ongoing interactions with the non-educational content or application. In response to a determination that a current value of the activity timer exceeds a predetermined threshold value, an interruption process is triggered on the client device causing at least one educational activity to be performed by the user of the client device. Before allowing interaction with the non-educational content or application, the educational activities must be satisfactorily completed.

13 Claims, 4 Drawing Sheets

(51) Int. Cl.
*G09B 7/04* (2006.01)
*G09B 7/00* (2006.01)

(56) References Cited

U.S. PATENT DOCUMENTS

| | | | | |
|---|---|---|---|---|
| 5,267,865 | A | * | 12/1993 | Lee .................. G09B 5/065 273/430 |
| 5,286,036 | A | * | 2/1994 | Barabash ............ A63F 9/183 273/429 |
| 5,716,273 | A | * | 2/1998 | Yuen .................. A63F 13/10 463/29 |
| 6,024,572 | A | * | 2/2000 | Weyer ................ G09B 5/065 434/169 |
| 9,213,845 | B1 | * | 12/2015 | Taraki ................ G06F 21/10 |
| 2003/0077559 | A1 | * | 4/2003 | Braunberger ........ G09B 7/00 434/322 |
| 2005/0089834 | A1 | * | 4/2005 | Shapiro .............. G09B 7/00 434/323 |
| 2007/0112612 | A1 | * | 5/2007 | Dollens .............. G06Q 10/10 705/7.13 |
| 2010/0293453 | A1 | * | 11/2010 | Schwarz ........... G06F 16/9535 715/234 |
| 2017/0085569 | A1 | * | 3/2017 | Gupta ................ H04L 67/22 |

* cited by examiner

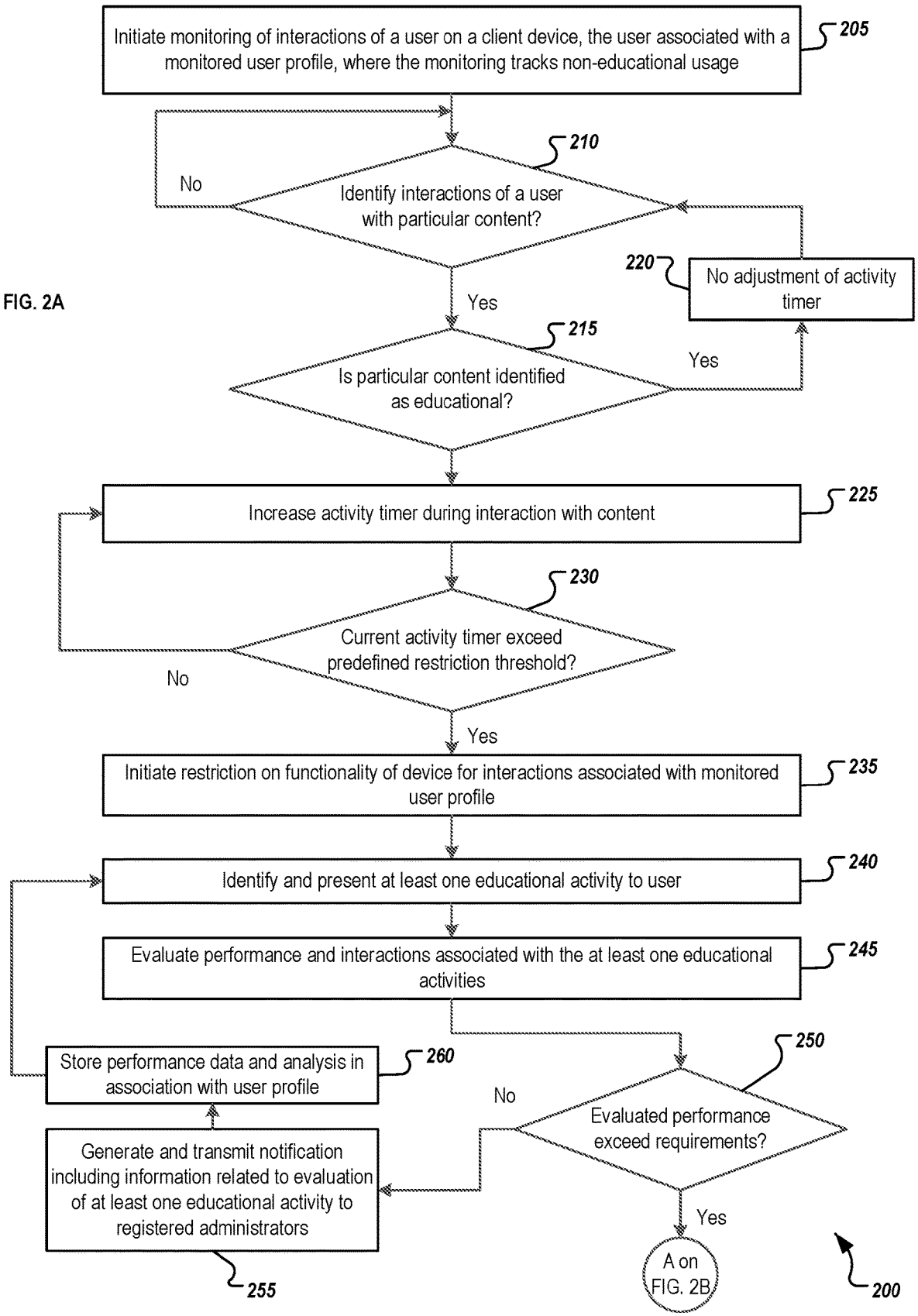

Section 1

Harry

Subject Information _305_
- Math
- Science
- Writing
- History
- Foreign Language
- Art

Section 2

Harry

Shared Child Bio – as of 9/30 _310_

Subject Results
- Math = 105 q's asked    87%
- Art = 25 q's asked    85%
- History = 112 q's asked    95%

Trend
9/28 = 40 total asked, 91% correct
8/26 = 61 total asked, 88% correct
8/21 = 46 total asked, 87% correct

Kids Kare Forum and News Area _315_
- Updated questions for this month
- Lisa's analysis for August 2020
- Updated Topic List from Ms. Smith
- Connect with other parents

Teacher / Parent Shared Child Report _320_

- Requirement / Threshold:    92%
- Child Performance:    94%

Harry

- Requirement / Threshold:    85%
- Child Performance:    90%

Ron

- Requirement / Threshold:    87%
- Child Performance:    78%

Hermione

SYSTEM, METHOD, AND APPLICATIONS FOR MONITORING ONLINE USAGE OF MINORS

CLAIM OF PRIORITY

This application claims priority under 35 USC § 119(e) to U.S. Patent Application Ser. No. 62/604,659, filed on Jul. 17, 2017, the entire contents of which are hereby incorporated by reference.

BACKGROUND

Mobile and online access is available to all persons in the United States, including our children and young adults. While many families enforce time restrictions on devices, many families are unable to monitor, on an ongoing basis, the actions and interactions in which their children participate. The ubiquitousness of smartphones, tablets, and other mobile devices to children as young as two or three, as well as the overwhelming use by elementary school-aged kids and teenagers has become a hindrance to the education of our youth.

SUMMARY

The present disclosure involves systems, software, and computer implemented methods associated with a smart monitoring system used to monitor, manage, and modify the usage, by one or more monitored subjects, of various applications and/or websites on a mobile or other computing device. A first example method includes monitoring a user interaction performed at a client device. A determination is made as to whether the monitored user interaction is associated with non-educational content or a non-educational application. In response to determining that the monitored user interaction is associated with non-educational content or a non-educational application, an activity timer is increased based on ongoing interactions with the non-educational content or the non-educational application. In response to determining that the current value of the activity timer exceeds a predetermined threshold value, an interruption process is triggered on the client device causing at least one educational activity to be performed by the user of the client device.

Implementations can optionally include one or more of the following features.

In some instances, the non-educational content or the non-educational application comprises a multimedia video, wherein the multimedia video is classified as entertainment.

In some instances, in response to determining that the monitored user interaction is associated with educational content or an educational application, the activity timer is maintained at a present value based on ongoing interactions with the educational content or the educational application.

In some instances, in response to determining that the current value of the activity timer does not exceed the predetermined threshold value, the user interactions performed at the client device continue to be monitored.

In some instances, the activity time is increased based on an actual amount of time spent interacting with the non-educational content or the non-educational application. In other instances, the activity time is increased based on a number of discrete non-educational activities are monitored.

In some instances, the predetermined threshold value is defined by an administrator associated with the user, wherein he administrator manages the at least one educational activities.

In some instances, triggering the interruption process comprises pausing the non-educational content or the non-educational application.

In some instances, the method further comprises evaluating a performance of the at least one educational activity and determining whether the evaluated performance exceeds a performance threshold. In response to determining that the evaluated performance exceeds the performance threshold, the interruption process can be ended on the client device and access to the non-educational content or the non-educational application can be provided. In response to determining that the evaluated performance does not exceed the performance threshold, at least one additional educational activity to be performed during the interruption process may be identified. In some of those instances, the results of the evaluation of the performance of the at least one educational activity are transmitted to at least one administrator associated with the user.

In some instances, the method may further comprise determining, after the triggering of the interruption process and before the at least one educational activities are completed, that the user of the client device has ended the at least one educational activity. In response to the determination, an indication is stored that the interruption process is to be maintained in response to the next interaction with the client device. In response to determining an attempt at a next interaction with the client device by the user, the interruption process is triggered in response to the attempt at the next interaction.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 2A-2B comprise a flow chart of an example method performed in connection with a system for monitoring, managing, and modifying the usage, by one or more monitored subjects, of various applications and/or websites on a mobile or other computing device.

FIG. 3 provides example screenshots associated with the present solution, including portions illustrating performance results associated with an analysis of the performance of one or more educational activities by a user as delivered to a particular administrator, such as a parent or teacher.

DETAILED DESCRIPTION

Figure 1:
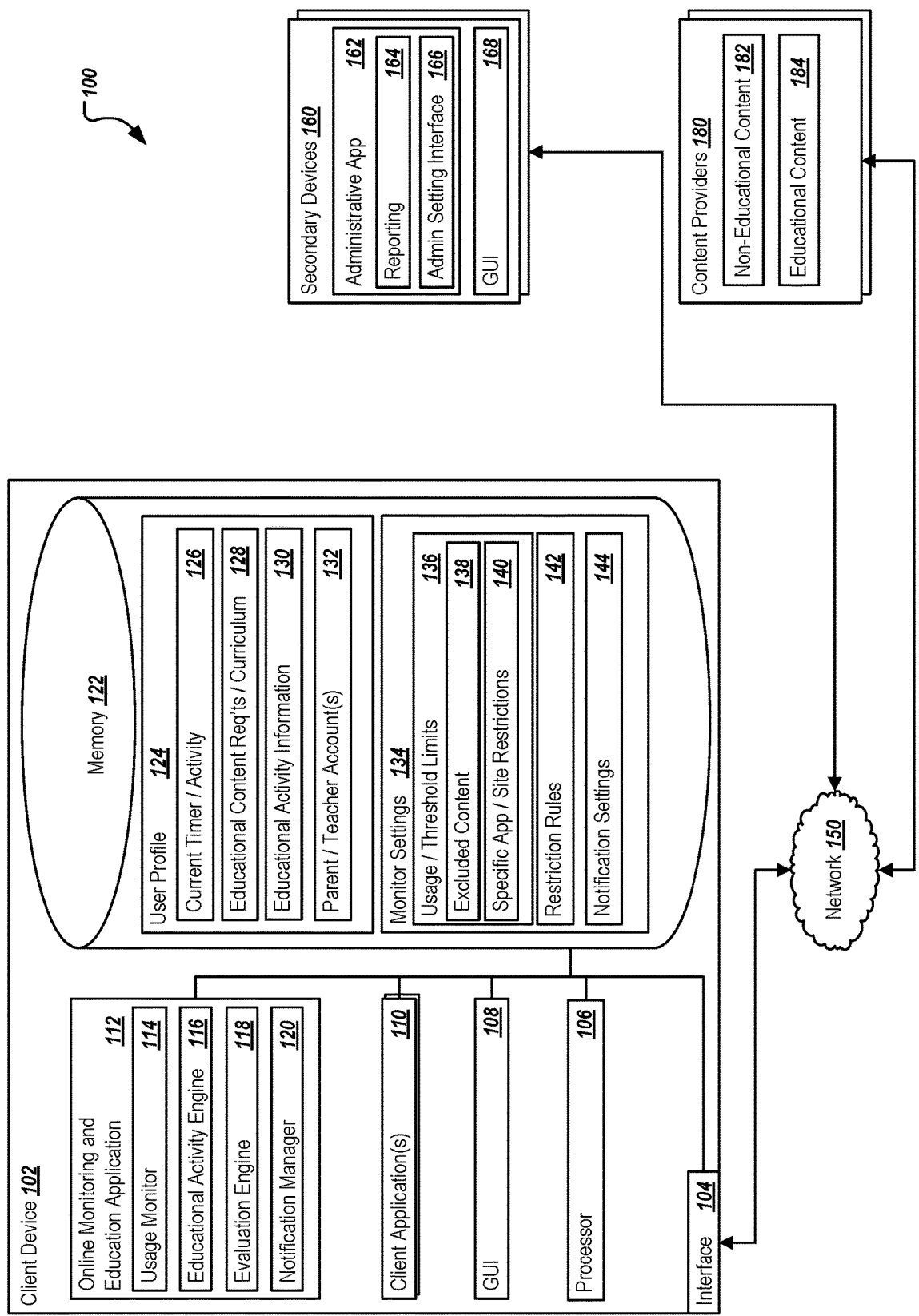
FIG. 1 is a block diagram illustrating an example system for monitoring, managing, and modifying the usage, by one or more monitored subjects, of various applications and/or websites on a mobile or other computing device.

Many children are fortunate enough to have access to various mobile computing screens and applications, whether in school or at home. In the school setting, usage may be closely monitored by teachers and school administrators, or the device may be locked down to enforce strict content and applications that can be downloaded and executed. In many instances, children using devices outside of school may be more prone to view and interact with non-educational and potentially academically detrimental applications and content. One of the goals of the present solution is to provide additional insight to parents, guardians, and teachers to better understand the ongoing usage of children/students, and to interrupt the presentation of non-educational content on the device and to automatically present educational materials, multimedia, and information to those children even when not physically at the location of the child/student (i.e., the user) or not heavily manually monitoring the user's usage.

Implementations of the present disclosure are generally directed to a smart monitoring system used to monitor, manage, and modify the usage, by one or more dependents (e.g., children, grandchildren, etc.) or other monitored subjects (e.g., students, wards, patients, etc.), of various applications and/or web sites on a mobile or other computing device. Specifically, the non-educational applications and interactions on a mobile and/or other device can be monitored by an automated software solution based on default or customized settings to determine when a particular level of activity on the device reaches a particular threshold (e.g., a total time, a number of games played, a number of videos watched, etc.). Once the threshold is met, the smart monitoring system can initiate or cause to initiate at least one educational activity. The at least one educational activity may be a series of educational questions and answers, the required watching of pre-defined or dynamically determined education multimedia (with or without follow-up questions), or another suitable and/or similar activity. The smart monitoring system can track the interactions with the at least one educational activity and can determine the user's performance during the same (e.g., eye tracking, interactions, etc.), as well as score any follow up questions or activities. The user's profile can be associated with one or more adults or administrators, and information related to the non-education use of the device and at least one educational activity can be provided to those associated adults, administrators, or other registered person.

The smart monitoring system can interrupt, restrict, and/or otherwise modify the behavior of the user and the user device. For example, once a particular threshold is met for initiating the at least one educational activity, such as watching 4 consecutive YouTube videos (either in a dedicated app or via the web), the smart monitoring system can pause or close YouTube, restrict usage of YouTube, and, in some instances, restrict usage or content from any other non-educational sources (as defined in a set of restriction rules). The smart monitoring system can then initiate or itself present the at least one educational activity. In one example, a video or other multimedia presentation associated with curriculum of the student at school may be played on the device. After providing the presentation, the smart monitoring system may, in this example, provide one or more follow-up questions to confirm that the user reviewed and/or paid attention to the presentation. Upon completion of the questions and the at least one educational activity, the smart monitoring system may release the restriction of the device and the non-educational content, as well as prepare and transmit a progress report or update to one or more registered users. In some instances, a threshold counter may be reset, or a new counter may be generated to watch for future usage. In some instances, current streaks of non-educational interactions can be monitored, as well as interactions over any suitable period of time (e.g., over 30 minutes, over X hours, daily, weekly, monthly, or other suitable period). Additionally, non-time-based intervals our counts may be kept and used to determine when a threshold is met (e.g., play a certain number of attempts in a game, watch a particular number of videos, etc.). Still further, the thresholds may be based on both time and particular interactions, or may be based on varying combinations thereof. In some instances, particular applications and/or content may be flagged as or can be determined to be educational. The smart monitoring system may not include any time or interactions with such educational content and/or applications in the threshold comparison, thereby promoting the use of such applications and content for the user.

In some instances, the present solution may be presented to users as an overlay to an activity that is currently executing. For example, a YouTube video may be overlayed with a presentation related to the current solution. The use of an overlay, or the effects of the overlay, can be controlled to force a user to focus or pay attention to the questions. The overlay or presentation may cover the entirety or a relatively significant portion (e.g., 60-95%) of the user interface, forcing concentration by the user prior to allowing full use of the underlying application. The settings provided to an administrator can provide the selection of the particular educational activity to be performed, a certain performance threshold that must be met (e.g., a number of correct answers, a number of answered questions, an amount of time, etc., as well as any suitable combination thereof), or other requirements before allowing the normal use of the application to continue. In the case of an overlay, the overlay may disappear once the requirements are sufficiently met. In some instances, an initial result may cause further educational activities or criteria to be met. For example, if a first set of 3 questions are answered incorrectly, an additional set of questions may be presented. In those instances, the additional set of questions may further modify the operation of the underlying application and its presentation (e.g., mute, pause, quit, etc.). Only after the additional requirements are completed will the operations be returned to normal.

FIG. 1 provides an example environment 100 for implementing features of the present application. FIG. 1 as illustrated is an example environment, and can include more, fewer, or alternative components to those illustrated. Similarly, any illustrated component may be split into additional components, may share functionality with another component (illustrated or not), or may be combined with or otherwise included in functionality provided by another component (illustrated or not). As illustrated, example environment 100 includes a client device 102, one or more secondary devices 160 associated with a parent or teacher, and a plurality of content providers 180, each communicably coupled and in communication via network 150.

Turning to the illustrated example implementation, FIG. 1 is a block diagram illustrating an example system 100 for monitoring, managing, and modifying the usage, by one or more monitored subjects, of various applications and/or websites on a mobile or other computing device. System 100 includes functionality and structure associated with a smart monitoring solution executing on a particular client device 102 that monitors the particular applications and/or content with which a particular user of that client device 102 uses or interacts. In particular, the online monitoring and education application 112 (monitoring application 112) is used to monitor the usage of various other applications 110 and/or content 182, 184 interacted with by the user. When particular usage thresholds are met, the monitoring application 112 can trigger and/or initiate at least one educational activity based on the stored user profile 124 and/or monitor settings 134. In some instances, a set of restriction rules 142 can define how the monitoring application 112 handles operations. Results of the at least one educational activity can be provided to one or more related secondary devices 160 based on settings within or associates with the user profile 124. As illustrated, system 100 includes or is communicably coupled with, via network 150, at least one client device 102, secondary device(s) 160, and content provider(s) 180. System 100 is a single example of a possible implementation, with alternatives, additions, and modifications possible for performing some or all of the described operations and functionality. Although shown separately, in some implementations, functionality of two or more systems, servers, or illustrated components may be provided by a single system or server. In some implementations, the functionality of one illustrated system or server may be provided by multiple systems, servers, or computing devices, including those physically or logically local or remote to each other. Any combination or permutation of systems may perform the functionality described herein. In some instances, particular operations and functionality described herein may be executed at either the client device 102, at a backend server (not shown), or at one or more other non-illustrated components, as well as at a combination thereof.

As used in the present disclosure, the term "computer" is intended to encompass any suitable processing device. For example, client device 102 may be any computer or processing device (or combination of devices) such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 102 may be any system which can request data, execute an application (e.g., client application(s) 110 and monitoring application 112), and/or interact with the secondary devices 160 and content providers 180, where appropriate. The client device 102, in some instances, may be any other suitable device, including a mobile device, such as a smartphone, a tablet computing device, a smartwatch, a laptop/notebook computer, a connected device, or any other suitable device. Additionally, the client device 102 may be a desktop or workstation, server, or any other suitable device. In general, each illustrated component may be adapted to execute any suitable operating system, including Linux, UNIX, Windows, Mac OS®, Java™, Android™, Windows Phone OS, or iOS™, among others.

Illustrated system 100 includes at least one client device 102, and may include a plurality of client devices 102 in some instances. Each client device 102 may be associated with one or more users and their associated user profiles 124. In many instances, at least one of the user profiles 124 may be associated with or be connected to the monitoring application 112 and a related set of monitoring options. In some instances, one or more of the user profiles 124 included on the device may not be associated with a monitored profile, and may represent a parent account or an older sibling, where those user profiles 124 are associated with alternative users of the device 102.

Each client device 102 may generally be any computing device operable to connect to or communicate within the system 100 via the network 150 using a wireline or wireless connection. In general, the client device 102 comprises an electronic computer device operable to receive, transmit, process, and store any appropriate data associated with the system 100 of FIG. 1. As illustrated, the client device 102 can include one or more client applications 110, which may represent particular mobile apps or desktop programs, including both dedicated apps (e.g., the YouTube app) and general browsers (e.g., Mobile Safari, Mobile Chrome, or other mobile browsers), as well as the illustrated monitoring application 112. In some instances, the monitoring application 112 may be a part of the operating system executing on the client device 102, or may be a standalone application or client-side agent of a backend application (e.g., a backend monitoring service (not shown), where monitored information is shared to the backend system and processed, at least in part, remotely from the client device 102). In still other instances, the monitoring application 112 may be an agent used for monitoring local interactions performed by monitored users associated with specific user profiles 124 at the client device 102 which provides information back to a remote server, platform, or cloud-based system, where that remote system performs many of the functions described herein as performed on the client device 102. Any suitable configuration may be used in various implementations, and the illustration of FIG. 1 is not meant to be limiting.

In some instances, the client device 102 may comprise a device that includes one or more input components, such as a keypad, touch screen, camera, microphone, or other component(s) that can interact with the client application 110 and/or the monitoring application 112 and other functionalities, and one or more output components that convey information associated with the operation of the applications (110, 112) and their presentations to the user of the client device 102. In some instances, input may be received as natural language inputs and can be converted into appropriate input to the applications. The output components can include a display, one or more speakers, or any other suitable output components. The information presented by the output components can include digital data, visual information, auditory output, or a graphical user interface (GUI) 108, as shown with respect to the client device 102. In general, client device 102 comprises an electronic computer device operable to receive, transmit, process, and store any appropriate data associated with the environment 100 of FIG. 1, and particular components illustrated in client device 102 or other components may be any application, framework, agent, or other software capable of performing the operations described herein. In some instances, the components may be a part of another component or providing functionality performed by a combination of different components.

In some instances and as mentioned previously, the client device 102 may be a mobile device, including but not limited to, a smartphone, a tablet computing device, a laptop/notebook computer, a smartwatch, or any other suitable device. In other instances, client device 102 may instead be a workstation, a dedicated console or computer, or any other suitable device. In some instances, the client application(s) 110 may be a web browser, mobile application, cloud-based application, or dedicated remote application or software capable of interacting with at least some of the remote content providers 180 via network 150 to request information from and/or respond to one or more of those systems. With regard to the client applications 110, some or all usage of those client applications 110 may be non-educational, such as non-educational gaming, non-educational video watching, etc. In some instances, usage of particular applications 110 may be determined to be non-educational, and may be measured and monitored by the monitoring application 112. In some instances, particular applications 110 and/or content presented by those applications 110 may be capable of being either an educational or a non-educational usage. In some instances, particular usage determined to be educational (e.g., based on a rating system, a content analysis process, etc.) may not affect the evaluation versus the threshold for triggering a particular educational activity, and instead only certain applications and/or sites may be restricted or considered, while in others, some apps and/or content may be whitelisted and considered educational, or alternatively, not considered non-educational.

The monitoring application 112 can perform various operations related to the solutions provided here. While illustrated as a separate application within the client device 102, the monitoring application 112 may, in some instances, be a part of or included in the operating system, such that no separate application is necessary. In other instances, multiple applications and/or components may perform the operations described herein related to the monitoring application 112. In some instances, such as when a browser is used to access portal pages and/or remote content, the monitoring application 112 may be located remotely from the client device 102. In some instances, portions of the monitoring application 112 may be located at the client device 102, while other portions execute remotely. The monitoring application 112 may be any suitable application, component, programming code, daemon, agent, or other suitable component, capable of monitoring the interactions performed by a user associated with certain user profiles 124. As noted, the user profiles 124 being monitored may be those associated with a minor, a student, or another person for whom a responsible administrator or other user desires monitoring of device 102 usage. The monitoring application 112, as illustrated, includes a usage monitor 114, an educational activity engine 116, an evaluation engine 118, and a notification manager 120. Alternative implementations may include the same, fewer, or additional components.

The usage monitor 114 is used to monitor usage, as described. In particular, the usage monitor 114 is used to identify interactions and time spent interacting with non-educational content. The monitor settings 134 (stored in memory 122) define a set of particular usage threshold limits 136 to which the user is allowed access prior to at least one educational activity being triggered. The monitor settings 134 may be specifically associated with one or more particular user profiles 124, and can differ between different profiles 124 where multiple profiles 124 are associated with a single device, such as multiple students or family members. In some instances, the monitor settings 134 may be a universal or default set of settings, and can, in some instances, be customized for particular devices 102 and profiles 124. In some instances, the usage monitor 114 may monitor or track the actions of one or more client applications 110 to determine whether current usage represents educational or non-educational usage. After identifying non-educational usage by a user associated with a monitored user profile 124, a current timer or activity monitor 126 associated with that profile 124 can be updated. In some instances, such updates are made in real-time, while in others, the updates can be made at certain intervals, or after completion of a particular task or action within the application 110. The usage thresholds 136 determining whether the monitored usage exceeds the allowed amount may be based off of time spent interacting with non-educational content or apps, particular discrete tasks performed with regard to non-educational content or apps, other suitable quantitative or qualitative analysis of interactions with non-educational content, or upon any combination thereof. Monitored usage related to those thresholds can be monitored and stored, where the usage monitor 114 can compare the monitored usage included in the current timer and/or activity measure 126 to the threshold 136 to determine if such a threshold is met. In some instances, the usage threshold 136 may be associated with a set of excluded content 138 identified as explicitly not to be considered or counted in the current activity timer 126 by the usage monitor 114. Examples of such content 138 may include online content tagged as educational (e.g., a movie identified as a documentary, a particular learning website, school-assigned content, etc.), content that is evaluated by a third-party system or specifically included in an educational section of content associated with a particular content provider 180 (e.g., educational content 184), or any other suitable content. Similarly, specific applications and/or websites 140 may be associated with particular non-educational content and applied to the current timer 126, or instead whitelisted or defined as educational apps or sites that are not to be counted or considered by the monitoring tool 112. The usage monitor 114 may be able to compare monitored usage to those apps and content to determine whether they should be included in the activity analysis.

Once the defined thresholds are determined to be met, the usage monitor 114 can trigger or initiate at least one educational activity to be performed by the user associated with the user profile 124. The educational activity engine 116 can manage the at least one educational activity, and be used to present and interact with the at least one educational activity. The what of those at least one educational activities may be defined by a set of educational content requirements and curriculum 128, which may be associated with a default set of age-appropriate educational content for particular user profiles 124 (e.g., based on stored demographic information about the user), or custom-built or custom defined educational materials, such as particular lesson plans, multimedia content, and other pre-defined and/or dynamically generated content. In some instances, the educational content requirements and curriculum 128 may be connected to a back end or cloud-based educational content provider, where relevant content can be downloaded or streamed to the client device 102. In some instances, administrators (e.g., parents or teachers) can define particular subjects, topics, study materials, movies, questions, or other educational materials to be provided as the at least one educational activity. In some instances, the particular materials and content may be weighted based on input from the administrator, school records, prior educational activities and identified weaknesses, current events, class schedules, interests, and any other particular weighting and/or considerations. Certain subjects, activities, and content may be preset into a particular order or may be provided in a random or semi-random manner. Any such order or intelligence to the particular content and educational activities can be provided by the educational activity engine 116 and settings defined by one or more responsible administrators, parents, or teachers, among others.

In some instances, the educational content requirements and curriculum 128 may include or identify particular educational activities to be performed (managed by the educational activity engine 116), and the results or actions required by the user for particular educational activities can be evaluated by an evaluation module 118 to determine whether the actions performed in association with the at least one educational activity are considered successful and a complete. In some instances, simply watching some educational content may be considered a successful performance, while in others, questions may be presented with a certain percentage being answered correctly being required for success and completion. In some instances, completion of the activity may require a manual grading or review, such as a research question or essay requirement. In such instances, the response from the user may be provided to a person (e.g., a parent, a teacher, etc.) via network 150 and a notification manager 120, such that the response can be evaluated at one of the secondary devices 160 (or, reviewed at the client device 102 and approved, such as by input of a parent or teacher code or identifier). In others, the evaluation module 118 may automatically determine if the performance satisfies any specific requirements or benchmarks set in association with the curriculum 128. In addition to a success or failure determination, the evaluation engine 118 can perform an in-depth analysis of performance in the current at least one educational activity as well as trends over time. Using the notification manager 120, one or more associated parent and/or teacher accounts 132 can be notified of the current and/or historical performance of the user (based on a customizable set of notification settings 144), allowing tracking and monitoring to be automated by the system. The notification settings 144 can be managed by the administrator, parent, and/or teacher to allow particular updates, analytical data, and other information to be provided to those persons, allowing significant flexibility in administering the user profile 124 and interactions on the client device 102. In general, the notification manager 120 may be a component of the monitoring application 112 or a separate mechanism, component, agent, or other software for managing the notifications.

The restriction rules 142 included in the monitor settings 124 may define the amount of educational activities or interactions to be required when a threshold is met or exceeded. The educational materials may be grouped into units, materials, lesson plans, questions, or content of a predetermined length or level of effort. The restrictions rules 142 can then define how much or how long the interruption by the monitoring application 112 is to last or is to be required by the user to complete prior to returning full control of the device 102, where that could be defined by a minimum time or level of effort. The restrictions rules 142 may also define the level of restriction applied to the client device 102 once the threshold is met. For example, in one instance, no other applications or content other than the educational content may be available after the interruption. In other instances, such as where some applications may be capable of presenting both educational and non-educational content, presentations during the restricted time may be limited to educational content 184. Similarly, a web browser may only present educational content 184, and may reject or hide non-educational content 182 obtained from content providers 180. In some instances, the restriction rules 142 may require the at least one educational activity to be performed without delay, and may only allow continued use of the client device 102 and its functionality after completion of the at least one educational activity.

As noted the performance of the at least one educational activity can be tracked, with results being stored in the set of educational activity information 130. The set of educational activity information 130 may include historical performance in one or more educational activities, analyzed performance metrics, and other relevant information sets about completion of and performance associated with the at least one educational activities. The results of the evaluation engine's 118 processing of the at least one educational activity and any associated user interactions can be calculated and stored in the set of educational activity information 130, and, where appropriate, provided to the appropriate persons and/or devices for further review and analysis, such as a working parent's smartphone, a teacher's device, or any other suitable secondary device 160.

As illustrated, the client device 102 includes an interface 104. Interface 104 is used by the client device 102 for communicating with other systems in a distributed environment—including within the environment 100—connected to the client device 102 and/or network 150, e.g., one or more secondary devices 160 and/or content providers 180, as well as other systems or components communicably coupled to the network 150. Generally, the interface 104 comprises logic encoded in software and/or hardware in a suitable combination and operable to communicate with the network 150 and other communicably coupled components. More specifically, the interface 150 may comprise software supporting one or more communication protocols associated with communications such that the client application(s) 110, the monitoring application 112, the network 150, and/or the interface's hardware is operable to communicate physical signals within and outside of the illustrated environment 100.

Network 150 facilitates wireless or wireline communications between the components of the environment 100 (e.g., between combinations of the client device(s) 102, secondary devices 160, the content providers 180, and/or the other components, among others) as well as with any other local or remote computer, such as additional mobile devices, clients, servers, remotely executed or located portions of a particular component, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the illustrated components or portions thereof (e.g., the monitoring application 112, such as when the user accesses content remotely) may be included within network 150 as one or more cloud-based services or operations. The network 150 may be all or a portion of an enterprise or secured network, while in another instance, at least a portion of the network 150 may represent a connection to the Internet. In some instances, a portion of the network 150 may be a virtual private network (VPN) or an Intranet. Further, all or a portion of the network 150 can comprise either a wireline or wireless link. Example wireless links may include 802.11a/b/g/n/ac, 802.20, WiMax, LTE, and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

The client device 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the client device 102, in particular those related to executing the various modules illustrated therein and their related functionality. Specifically, the processor 106 executes the algorithms and operations described in the illustrated figures, as well as the various software modules and functionalities, including the functionality for sending communications to and receiving transmissions from various components in the illustrated system 100, as well as to process and perform operations related to the monitoring application 112. Each processor 106 may have a single core or multiple cores, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

GUI 108 can interface with at least a portion of the environment 100 for any suitable purpose, including generating a visual representation of the client application(s) 110 and/or the monitoring application 112, presenting multimedia content to the user, presenting UIs related to one or more of the illustrated applications 112 including setting preferences for a particular user profile 124, or any other suitable presentation of information. GUI 108 may also be used to view and interact with various Web pages, applications, and Web services located local or external to the client device 102, as well as information relevant to the client application 110. Generally, the GUI 108 provides the user with an efficient and user-friendly presentation of data provided by or communicated within the system. The GUI 108 may comprise a plurality of customizable frames or views having interactive fields, pull-down lists, and buttons operated by the user. For example, the GUI 108 may provide interactive elements that are used to interrupt a user's non-educational interactions with the client device 102 and present content associated with one or more educational activities. In general, the GUI 108 is often configurable, supports a combination of tables and graphs (bar, line, pie, status dials, etc.), and is able to build real-time portals, application windows, and presentations. Therefore, the GUI 108 contemplates any suitable graphical user interface, such as a combination of a generic web browser, a web-enabled application, intelligent engine, and command line interface (CLI) that processes information in the platform and efficiently presents the results to the user visually.

As illustrated, the client device 102 includes memory 122. In some implementations, the client device 102 includes a single memory or multiple memories. The memory 122 may include any type of memory or database module and may take the form of volatile and/or non-volatile memory including, without limitation, magnetic media, optical media, random access memory (RAM), read-only memory (ROM), removable media, or any other suitable local or remote memory component. The memory 122 may store various objects or data, including caches, classes, user profiles 124, frameworks, applications, backup data, objects, jobs, web pages, web page templates, database tables, database queries, repositories storing user information, and any other appropriate information including any parameters, variables, algorithms, instructions, rules, constraints, or references thereto associated with the purposes of the client device 102, client application(s) 110, and/or the monitoring application 112. Additionally, the memory 122 may store any other appropriate data. As illustrated, memory 122 includes, for example, the user profile 124 and monitor settings 134 previously described. In some instances, some or all of the data included in memory 122 in FIG. 1 may be located outside of the client device 102, including within network 150 as cloud-based storage and data, or remote at a server or other remote location, where appropriate.

The illustrated system 100 includes at least one secondary device 160 associated with one or more persons or systems associated with the user profile 124. Those secondary devices 160, as described, can be any suitable device at which one or more administrators can receive and interact with settings associated with the monitoring application 112, as well as to receive and review the actions and performance of the monitored user. The secondary devices 160 may be mobile devices (e.g., smartphones, tablets, smart watches, etc.), desktop systems, or any other device type. In some instances, the administrative app 162 may be available to allow the person associated with the secondary device 160 to access and interact with various user profile 124 and monitor settings 134 associated with a particular client device 102 and/or user profile 124. Further, the notification manager 120 and the notification settings 144 can be used to send and provide information to the administrative app 162 at the secondary device 160 and/or one or more other communication points, such as email, text, or other channels associated with various devices 160. In some instances, the secondary device 160 and the administrative app 162 may be provided information about a user's usage level, the at least one educational activity performed, and the evaluation of that performance. In some of those instances, the lifting of any restrictions placed on the client device 102 when the threshold his met may require explicit approval of the user of the secondary device 160, such as by reviewing and approving the monitored activity and interactions. In some instances, the user of the secondary device 160 may have the ability to remove restrictions entirely, remove restrictions for a period of time or for a particular activity, require additional educational activities to be performed, or perform any other suitable actions.

In general, the secondary devices 160 may be computing devices operable to connect to or communicate within the system 100 via the network 150 using a wireline or wireless connection and to interact with one or more monitoring applications 112 and user profiles 124. In some instances, some secondary devices 160 may only be used for notifications, such as text-based notifications (e.g., a smartwatch). Use of another device 160 may be required to interact with the results and the monitoring application 112.

In some instances, two or more administrators, parents, and/or teachers may be associated with a particular user profile 124, such that access of the same or varying levels of detail may be provided to different people, or to different portions of the profile 124 and/or settings 134. For example, a teacher may review the results of any educational activity to determine what topics to cover further during class and provide feedback regarding the defined curriculum 128, while a parent may review all information about the user profile 124 and settings 134, including by adjusting particular thresholds 136, modifying what is considered educational content or not (e.g., via the excluded content 138), and classify certain apps and websites as educational or not. The administrative app 162 may include a reporting engine 164 and an administrative interface 166 to perform these operations, where the reporting engine 164 can receive updates from the notification manager 120 and prepare or provide for presentation the analysis of usage and educational activity via GUI 168 (similar to or different from GUI 108). The administrative interface 166 can be used to interact with user profile 124 and monitor settings 134 to update, change, or otherwise interact with existing or new settings and restrictions.

The illustrated system 100 includes one or more content providers 180, such as websites, cloud-based content providers 180, app stores, and other locations at which content can be obtained and/or streamed. In some instances, particular content providers 180 may classify certain content as either educational content 184 or non-educational content 182, or otherwise provide information from which the educational (or non-educational) context can be derived. For example, content may be classified or tagged as related to nature, history, or science, and the usage monitor 114 may evaluate those classifications to determine that the content is considered educational. Similarly, other classifications not associated with educational content can be determined to be non-educational. In some instances, the content provider 180 may be an app store, where the provided content is app-based. In some instances, those apps or other content may be explicitly defined at the content provider 180 as educational or not. In other instances, the whitelist of the app and site restrictions 140 may determine whether they represent educational content or whether they present, during execution and interactions, educational or non-educational content where both types of content may be presented in a particular application (e.g., YouTube, iTunes, Google Play Video, etc.).

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2B:
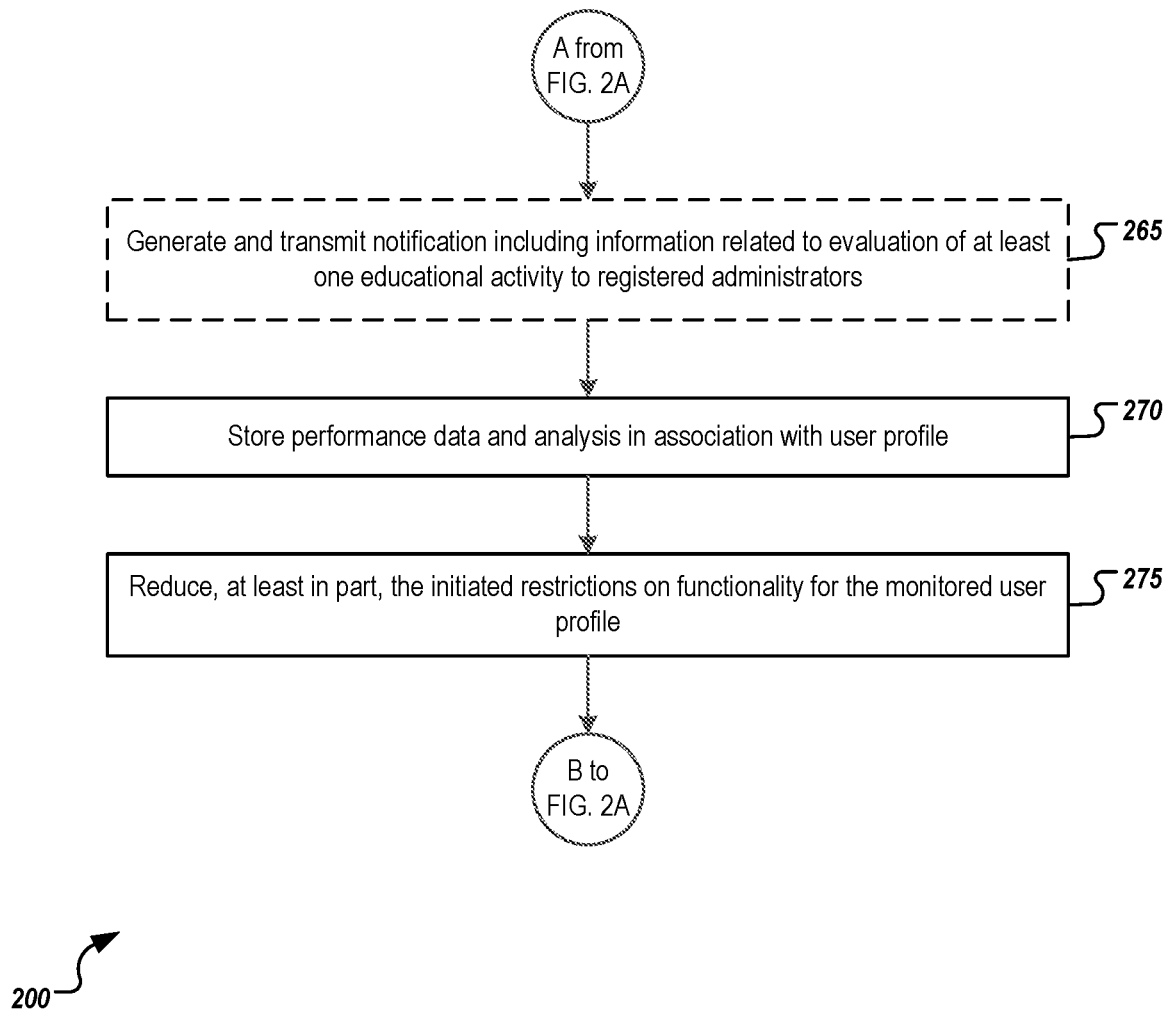

FIGS. 2A-2B comprise a flow chart of an example method 200 performed in connection with a system for monitoring, managing, and modifying the usage, by one or more monitored subjects, of various applications and/or websites on a mobile or other computing device. It will be understood that method 200 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 200 and related methods are executed by one or more components of the system 100 described above with respect to FIG. 1.

At 205, a monitoring application or agent (e.g., monitoring application 112) can initiate a monitoring of interactions by a user with a client device, where the user is associated with a monitored user profile. The monitoring can be initiated during certain hours, on certain days, or otherwise customized accordingly. The monitoring can track any type of interactions, but the present application focuses on non-educational interactions performed on the client device, which may be a mobile device or any other suitable device, including a gaming system, a tablet, or others.

At 210, a determination is made as to whether interactions of the monitored user with particular content is identified. The identification can be made by the monitoring application or agent at an application, device, or network level, where appropriate. Interactions may include web surfing, consumption of multimedia content, playing of games, messaging, programming activities, word processing, and others. If no interactions are identified, the method 200 loops during the initiated monitoring session until interactions are identified. If interactions are identified, however, method 200 continues at 215, where a determination is made as to whether the particular content with which the user interacts is educational. Whether the content is educational may be determined based on the application with which the interaction occurs, a tag or classification of particular content being consumed, or any other suitable method, including specific pre-identifications of content types, websites, and/or applications as educational or non-educational. If the particular content is determined to be educational, method 200 continues at 220, where the interactions are ignored for purposes of the activity timer, and continuing back to 210 to determine if new interactions with a different set of particular content begin occurring. In some instances, where the content or application is determined to be educational, the activity time may be decreased, either based on an actual amount of time interacting with the educational content, or by a certain portion or percentage of the current activity time. For example, after 30 minutes of educational user interactions, the activity timer may be decreased by 10 minutes, allowing additional non-educational time to pass before triggering an educational activity. If, however, the particular content is determined to be non-educational, method 200 continues at 225.

At 225, an activity timer associated with non-educational content interacted with by the monitored user is increased. The activity timer may be increased based on actual time spent interacting with non-educational content. In other instances, the activity timer may identify discrete non-educational activities performed, such as counting a number of videos watched on YouTube, a number of attempts at a game played, or any other suitable demarcation of a particular interaction. In some instances, a combination of time and activities may be used for the activity timer, while in others, only one may be used.

While the activity timer increases, a determination can be made at 230 whether the value of the current activity timer exceeds a predefined or dynamically determined restriction threshold. As described, the restriction threshold may represent an amount of time or interactions allowed for non-educational activities in settings associated with the monitoring application. For time-based restrictions, the determination of 230 may be made continuously, in intervals, or at any particular time during ongoing interactions. For activity-based restriction thresholds, the determination may be made prior to allowing a new interaction or activity to start. Any suitable evaluation timing and consideration may be used. If it is determined that the current activity timer is not exceeded, then method 200 returns to 225 where the activity timer continues to increase. In some instances, many loops between 225 and 230 may occur before the restriction threshold is exceeded. Once the threshold is determined to be exceeded, method 200 continues at 235.

At 235, the monitoring application can initiate a restriction on at least some of the functionality of the device, such as to limit further interactions with non-educational content and applications by the user associated with the monitored user profile. In some instances, a short grace period may be provided to allow the user to complete, save, or otherwise log off of their current interactions. In such instances, a timer may be presented via the interface to notify the user of an impending interruption, and can count down until the interruption. In some instances, the restriction can cause the non-educational content to be paused or stopped.

At 240, at least one educational activity can be identified and presented to the user for completion. The at least one educational activity may include educational quizzes, such as questions and answers, essays, or other requires for an educational response. In some instances, the at least one educational activity may include an academic lesson, educational multimedia content, or any other suitable interaction. The interruption is meant to ensure that significant periods of time are not wasted by the user on non-educational activities and interactions. Any suitable curriculum and/or analysis can be identified and presented to the user, with the curriculum being possibly tied to a current academic workload or related learning as identified by a parent or teacher of the user, as well as more general educational materials suitable for a user of similar age and abilities of the user. Any number of educational activities may be required to be completed at this stage, and can be provided as a setting to an administrator. In some instances, the amount of educational activities can increase if multiple interruptions and restricted functionality has been applied to the device and user in a particular session. In some instances, the at least one educational activity can be presented as an overlay to the non-educational content or application, either partially or fully blocking the user's view on the interface.

At 245, the performance and interactions with the at least one educational activity is evaluated. In some instances, the evaluation may be performed automatically, with software capable of determining whether the provided questions were answered correctly, whether the user interacted with the provided content, or any other evaluation. In some instances, the quality of the evaluated interactions may be compared to a performance requirement or threshold. In some instances, the evaluation may be at least in part a manual process, such as when the educational activity includes output or work product that must be graded in an objective manner, such as an essay or other written format that cannot or is not ideally suited for automatic evaluation. In those instances, the output or work product may be transmitted to the appropriate reviewer or grader, and the process may be delayed until such results are received. In such instances, at 250 a determination can be made whether the evaluated current interactions with the at least one educational activities exceeds the defined requirements. If not, method 200 continues at 255.

At 255, the results of the evaluation and any other related information may be communicated to one or more registered administrators (e.g., parents, teachers) associated with the user profile. The notification can be sent to one or more secondary devices or communication channels associated with those persons. In some instances, the notification may include actionable options allowing the registered users to request further specific educational activities to be performed. In other instances, the notifications may identify to the administrators particular subjects in which the user may need additional assistance, or recommend additional materials for follow up tutoring or assistance. At 260, the performance data and evaluation analysis can be stored in associated with the user profile for later use. In some instances, method 200 can then continue to 240, where one or more additional educational activities can be identified and presented to the user. In other instances, the user may choose to stop using the device. In some of those instances, the restrictions may remain until the user satisfactorily clears the educational activities, while in others, the restrictions may reset and revert to normal functionality after a certain period of time, or after a particular event (e.g., an explicit approval from a registered administrator).

Returning to 250, if the evaluation indicates the performance requirements were satisfied, method 200 continues to 265. At 265, a notification including information associated with the user's performance in the educational activities can be generated and transmitted to the registered administrators. This notification may be optional at this stage, and a set of notification settings can be customized to ensure administrators receive only those notifications relevant to the administrator and relevant to their role vis-a-vis the user. For example, for a parent, notifications may be requested whenever the threshold is met and whenever educational activities are performed, regardless of whether the results were positive or negative. A teacher, however, may only be interested in the particular results when measurable educational activities (e.g., quizzes or tests, essays, etc.) are performed.

At 270, the performance data and some or all of the evaluated analysis can be stored in association with the user profile. This data can be included in future notifications and reports, including periodic reports identifying progress or trends over a period of time.

In some instances, the restrictions on functionality of the device or particular applications initiated at 235 may be, at least partially, reduced or otherwise removed based on the successful completion of the at least one educational activity. In some instances, the functionality may be fully restored to the user associated with the monitored user profile. In others, a limited time of additional freedom to interact with non-educational content may be allowed. In still others, a subset of non-educational applications may be made available to the user.

FIG. 3 illustrates an example screenshot 300 provided to administrators associated with a particular user profile. The screenshot 300 provides feedback to the administrator regarding results, trends, and other evaluations of the educational activities performed using the solution, which can map or provide insight into the educational performance and capabilities of the user, as well as identify areas of improvement and possible extra work.

Multiple screens associated with the administrator pages are illustrated in FIG. 3. The screens may be shown or presented individually, although two or more may be presented simultaneously or in combination. Further, additional or alternative screens and presentations may also be provided in association with the solution.

In screen 305, a list of subjects associated with a particular user (here, Harry), are shown. For Harry, the subjects for which the educational activities with cover include math, science, writing, history, foreign language, and art. In some instances, the presentation may editable, such that the administrator (e.g., a parent or teacher) can modify the list of subjects, as well as the particular weights or frequency of particular subjects. Still further, by selecting a particular subject, sub-topics within those subjects may be selected and provided particular weights and/or frequency. Through the interface, a specifically-tailored program of educational activities and topics may be defined.

In screen 310, a shared child bio is presented for a particular user. In this case, results from the user Harry are presented, including a most recent set of subject-specific results over time, as well as results from specific dates and/or times. In some instances, additional details and breakdowns may be available, either initially upon presentation of the screen 310, or after a drill-down or other selection by the user viewing the presentations.

In screen 315, a general news area and listing may be provided for administrators to review new information associated with the application, as well as information specific to the administrator or the user's associated with the administrator. For example, an updated topic list from a teacher of at least one user may be provided via the application, such that administrators can manually edit, or, in some cases, automatically apply, user-specific topics and subjects based on this information.

In screen 320, a screen providing results associated with multiple users may be provided. The screen 320 may be available to allow parents or teachers to compare interactions and performance results of multiple users with which they are associated (e.g., their students or children). Screen 320 may also allow administrators to compare the results of their users' peers, such as friends, classmates, or other individuals. Presentations or particular graphical elements associated with each of the users may differ based on the results. For example, the results of Hermione, whose performance is below the requirement or threshold set of her, may display an unsmiling face in some instances.

It is noted than any appropriate presentation may be provided. In some instances, the presentation may be provided on a client device at which a user may interact with the educational activities. In other instances, the illustrated presentations may be provided remotely from the client device, either using an administrative program associated with the described solution, or a web page or portal providing administrative aspects and settings to the administrators. In some instances, the user themselves may view and interact with at least a portion of these or other presentations, allowing feedback related to ongoing performances, or allowing the user to customize their required educational activities.

In some implementations, the solution may be provided in various bundles combining questions and educational activities, along with appropriate settings and options, for various age-groups. In one instances, bundles may be available for (1) Pre-K thru $2^{nd}$ grade, (2) $3^{rd}$ grade thru $5^{th}$ grade, (3) $6^{th}$ grade thru $8^{th}$ grade, (4) $9^{th}$ grade thru $12^{th}$ grade, and (5) college/university level. In some instances, bundles may alternatively be specific to a particular topic or skill, such as personal finance (e.g., budgeting, managing a checkbook, etc.), current events, and professional examination preparation (e.g., GRE, LSAT, MCAT, etc.), among others.

While a number of specific subjects are described herein, any suitable subjects can be included, including math, science (e.g., general science, chemistry, anatomy, physics, mechanics, biology, etc.), computer science, reading, history, languages, writing (e.g., possibly via use of a stylus or other input device), art, and others. The subjects and topics may be linked to one or more teacher or class curriculums, workbooks, or syllabi, among others. In some instances, the educational activity may be watching a video, listening to a recorded message or presentation, or other non-question and answer-based activity. For example, basics about credit cards, budgeting, changing a tire, Further, the application may allow administrators to share information about a particular user's work to be shared, either through a channel internal to the application, or via external channels (e.g., text, email, etc.). Leaderboards and comparisons of different users may be available to compare groups of individuals, as well as personal feedback based on a user's age, advancement, or other metrics. In some instances, results can be reviewed by an administrator either online or offline via real-time and scheduled reports, result feedback, and other information.

In some instances, administrators may receive real-time feedback via a local application or interactive message when an associated user is interacting with the educational activities. The results of the performance can be provided to the administrator, and in some cases, the administrator may be provided the option of closing the underlying application on the user's device when results below a performance threshold are reported. Those options can be provided by commands via Bluetooth, WiFi, cellular data, or any other suitable communication technique.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The preceding figures and accompanying description illustrate example processes and computer implementable techniques. But the environment (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure

What is claimed is:

1. A system, comprising:
   at least one processor; and
   a computer-readable storage device coupled to the one or more processors and having instructions stored thereon which, when executed by the one or more processors, cause the one or more processors to perform operations comprising:
   monitoring user interactions performed at a client device, the monitoring associated with an activity counter associated with interactions related to non-educational content and non-educational applications, wherein the user interactions are associated with one or more sets of content or particular applications; and
   during the monitoring:
   determining whether a particular monitored user interaction is associated with non-educational content or a non-educational application;
   in response to determining that the particular monitored user interaction is associated with non-educational content or a non-educational application:
   identifying a discrete number of non-educational activities associated with the non-educational content or the non-educational application performed during the monitored user interaction;

increasing the activity counter based on the particular monitored user interaction associated with non-educational content or the non-educational application, wherein the activity counter is increased by an integer corresponding to the identified discrete number of non-educational activities; and in response to determining that the current value of the activity counter exceeds a predetermined threshold value, wherein the predetermined threshold value comprises an integer representing a discrete number of non-educational activities allowed, triggering an interruption process on the client device causing at least one educational activity to be performed by the user of the client device, wherein the interruption process comprises presenting the at least one education activity as an overlay on a same display of a current non-educational content or a current non-educational activity, wherein the overlay partially blocks a full view of the non-educational content or a current non-educational activity; and in response to determining that the current value of the activity counter does not exceed the predetermined threshold value, continuing to monitor the user interactions performed at the client device; and in response to determining that the particular monitored user interaction is associated with educational content or an educational application prior to the current value of the activity counter exceeding the predetermined threshold, continuing to monitor the user interactions performed at the client device and decreasing the activity counter based on a discrete number of educational activities performed during the monitored user interaction.

2. The system of claim 1, wherein the non-educational content or the non-educational application comprises a multimedia video, wherein the multimedia video is classified as entertainment.

3. The system of claim 1, wherein the predetermined threshold value is defined by an administrator associated with the user, wherein the administrator manages the at least one educational activities.

4. The system of claim 1, wherein triggering an interruption process comprises pausing the non-educational content or the non-educational application.

5. The system of claim 1, the operations further comprising:
evaluating a performance of the at least one educational activity;
determining whether the evaluated performance exceeds a performance threshold;
in response to determining that the evaluated performance exceeds the performance threshold, ending the interruption process on the client device and providing access to the non-educational content or the non-educational application, wherein ending the interruption process comprises removing the overlay such that the overlay does not block a full view of the non-educational content or a current non-educational activity; and
in response to determining that the evaluated performance does not exceed the performance threshold, identifying at least one additional educational activity to be performed during the interruption process.

6. The system of claim 5, wherein the results of the evaluation of the performance of the at least one educational activity are transmitted to at least one administrator associated with the user.

7. The system of claim 1, the operations further comprising:
determining, after the triggering of the interruption process and before the at least one educational activities are completed, that the user of the client device has ended the at least one educational activity;
in response to the determination, storing an indication that the interruption process is to be maintained in response to the next interaction with the client device; and
in response to determining an attempt at a next interaction with the client device by the user, triggering the interruption process in response to the attempt at the next interaction.

8. The system of claim 1, wherein determining whether the particular monitored user interaction is associated with non-educational content or a non-educational application comprises analyzing a predefined classification of the content or the application associated with the particular monitored user interaction to determine whether the predefined classification identifies the content or the application as educational or non-educational.

9. A computer-implemented method, comprising:
monitoring user interactions performed at a client device, the monitoring associated with an activity counter associated with interactions related to non-educational content and non-educational applications, wherein the user interactions are associated with one or more sets of content or particular applications, and wherein the activity counter represents an integer value; and
during the monitoring:
determining whether a particular monitored user interaction is associated with non-educational content or a non-educational application;
in response to determining that the particular monitored user interaction is associated with non-educational content or a non-educational application:
identifying a discrete number of non-educational activities associated with the non-educational content or the non-educational application performed during the monitored user interaction;
increasing the activity counter based on the particular monitored user interaction associated with non-educational content or the non-educational application, wherein the activity counter is increased by an integer corresponding to the identified discrete number of non-educational activities; and
in response to determining that the current value of the activity counter exceeds a predetermined threshold value, wherein the predetermined threshold value comprises an integer representing a discrete number of non-educational activities allowed, triggering an interruption process on the client device causing at least one educational activity to be performed by the user of the client device, wherein the interruption process comprises presenting the at least one education activity as an overlay on a same display of a current non-educational content or a current non-educational activity, wherein the overlay partially blocks a full view of the non-educational content or a current non-educational activity; and in response to determining that the current value of the activity counter does not exceed the predetermined threshold value, continuing to monitor the user interactions performed at the client device; and in response to determining that the particular monitored user interaction is associated with educational content or an educational application prior to the current value of the activity counter exceeding the predetermined threshold, continuing to monitor the user interactions performed at the client device and decreasing the activity counter based on a discrete number of educational activities performed during the monitored user interaction.

10. The method of claim 9, wherein the non-educational content or the non-educational application comprises a multimedia video, wherein the multimedia video is classified as entertainment.

11. The method of claim 9, wherein the predetermined threshold value is defined by an administrator associated with the user, wherein the administrator manages the at least one educational activities.

12. The method of claim 9, wherein triggering an interruption process comprises pausing the non-educational content or the non-educational application.

13. The method of claim 9, further comprising:
evaluating a performance of the at least one educational activity, wherein the results of the evaluation of the performance of the at least one educational activity are transmitted to at least one administrator associated with the user;

determining whether the evaluated performance exceeds a performance threshold;

in response to determining that the evaluated performance exceeds the performance threshold, ending the interruption process on the client device and providing access to the non-educational content or the non-educational application, wherein ending the interruption process comprises removing the overlay such that the overlay does not block a full view of the non-educational content or a current non-educational activity; and in response to determining that the evaluated performance does not exceed the performance threshold, identifying at least one additional educational activity to be performed during the interruption process.

* * * * *